United States Patent
O'Dea et al.

(10) Patent No.: US 7,499,786 B2
(45) Date of Patent: Mar. 3, 2009

(54) SYSTEM AND METHOD FOR DETERMINING WHEN TO UPDATE A SURFACE ESTIMATION VALUE INDICATIVE OF A CONDITION OF A ROADWAY SURFACE

(75) Inventors: Kevin A. O'Dea, Ann Arbor, MI (US); Aleksander B. Hac, Dayton, OH (US); Todd A. Belvo, South Lyon, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/488,354

(22) Filed: Jul. 18, 2006

(65) Prior Publication Data
US 2008/0021626 A1 Jan. 24, 2008

(51) Int. Cl.
*B60T 7/12* (2006.01)
*G06F 7/00* (2006.01)
*B60B 39/00* (2006.01)

(52) U.S. Cl. .............................. 701/80; 701/65; 701/71; 701/72; 701/73; 701/75

(58) Field of Classification Search ..................... 701/1, 701/73, 74, 75, 80, 82, 70
See application file for complete search history.

(56) References Cited

U.S. PATENT DOCUMENTS

| | | | |
|---|---|---|---|
| 5,667,286 A * | 9/1997 | Hoying et al. | 303/140 |
| 5,869,753 A * | 2/1999 | Asanuma et al. | 73/117.3 |
| 6,125,319 A | 9/2000 | Hac et al. | 701/80 |
| 6,418,369 B2 | 7/2002 | Matsumoto et al. | 701/80 |
| 6,453,226 B1 | 9/2002 | Hac et al. | 701/48 |
| 6,549,842 B1 | 4/2003 | Hac et al. | 701/80 |
| 2003/0093206 A1* | 5/2003 | Pallot | 701/70 |

* cited by examiner

*Primary Examiner*—Khoi Tran
*Assistant Examiner*—Bhavesh Amin
(74) *Attorney, Agent, or Firm*—Thomas N. Twomey

(57) ABSTRACT

A system and a method for determining when to update a surface estimation value indicative of a condition of a roadway surface are provided. The method includes determining a front axle cornering force error value based on a predicted front axle cornering force value and a first front axle cornering force value. The method further includes determining a threshold yaw rate error value based on the front axle cornering force error value. The method further includes indicating that the surface estimation value is to be updated when a yaw rate error value is greater than the threshold yaw rate error value.

3 Claims, 8 Drawing Sheets

SYSTEM AND METHOD FOR DETERMINING WHEN TO UPDATE A SURFACE ESTIMATION VALUE INDICATIVE OF A CONDITION OF A ROADWAY SURFACE

TECHNICAL FIELD

This application relates to a system and a method for determining when to update a surface estimation value indicative of a condition of a roadway surface.

BACKGROUND

A vehicle controller has been utilized to calculate a roadway surface estimate. In particular, the vehicle controller determines an error value indicating a difference between a desired vehicle yaw rate and a measured vehicle yaw rate. When the error value is greater than a constant threshold value, the roadway surface estimate is determined.

A drawback associated with the foregoing vehicle controller functionality, is that the vehicle controller may not update the roadway surface estimate as regularly as desired. For example, when the vehicle controller has previously determined a roadway surface estimate that is indicative of a dry roadway, and the vehicle subsequently moves over a relatively wet roadway and begins to slide, the driver may still be able to control the vehicle sufficiently such that the error value is not greater than the constant threshold value. As a result, even though the vehicle is moving over a wet roadway, the vehicle controller may not update the roadway surface estimate. Accordingly, the roadway surface estimate may not reflect the current roadway surface condition.

Accordingly, the inventors herein have recognized a need for an improved system for determining when to update a surface estimation value indicative of a roadway condition.

SUMMARY OF THE INVENTION

A method for determining when to update a surface estimation value indicative of a condition of a roadway surface in accordance with an exemplary embodiment is provided. The method includes determining a yaw rate error of a vehicle. The method further includes determining a predicted front axle cornering force value indicative of a predicted front axle cornering force, utilizing a vehicle dynamics model. The method further includes determining a first front axle cornering force value indicative of a front axle cornering force, based on at least one vehicle operational parameter. The method further includes determining a front axle cornering force error value based on the predicted front axle cornering force value and the first front axle cornering force value. The method further includes determining a threshold yaw rate error value based on the front axle cornering force error value. The method further includes indicating that the surface estimation value is to be updated when the yaw rate error value is greater than the threshold yaw rate error value.

A system for determining when to update a surface estimation value indicative of a condition of a roadway surface in accordance with another exemplary embodiment is provided. The system includes at least one sensor generating a signal indicative of a vehicle operational parameter. The system further includes a controller operably communicating with the sensor. The controller is configured to determine a predicted front axle cornering force value indicative of a predicted front axle cornering force, utilizing a vehicle dynamics model. The controller is further configured to determine a first front axle cornering force value indicative of a front axle cornering force, based on the signal. The controller is further configured to determine a front axle cornering force error value based on the predicted front axle cornering force value and the first front axle cornering force value. The controller is further configured to determine a threshold yaw rate error value based on the front axle cornering force error value. The controller is further configured to indicate that the surface estimation value is to be updated when a yaw rate error value is greater than the threshold yaw rate error value.

A method for determining when to update a surface estimation value indicative of a condition of a roadway surface in accordance with another exemplary embodiment is provided. The method includes determining an average front wheel slip value indicative of an average amount of front wheel slip associated with first and second wheels coupled to a front vehicle axle. The method further includes determining an average rear wheel slip value indicative of an average amount of rear wheel slip associated with third and fourth wheels coupled to a rear vehicle axle. The method further includes determining a slip error value based on the average front wheel slip value and the average rear wheel slip value. The method further includes determining a threshold yaw rate error value based on the slip error value. The method further includes indicating that the surface estimation value is to be updated when a yaw rate error value is greater than the threshold yaw rate error value.

A system for determining when to update a surface estimation value indicative of a condition of a roadway surface in accordance with another exemplary embodiment is provided. The system includes a controller configured to determine an average front wheel slip value indicative of an average amount of front wheel slip associated with first and second wheels coupled to a front vehicle axle. The controller is further configured to determine an average rear wheel slip value indicative of an average amount of rear wheel slip associated with third and fourth wheels coupled to a rear vehicle axle. The controller is further configured to determine a slip error value based on the average front wheel slip value and the average rear wheel slip value. The controller is further configured to determine a threshold yaw rate error value based on the slip error value. The controller is further configured to indicate that the surface estimation value is to be updated when a yaw rate error value is greater than the threshold yaw rate error value.

A method for determining a surface estimation value indicative of a condition of a roadway surface in accordance with another exemplary embodiment is provided. The method includes determining a first roadway surface estimation value based on a hydraulic pressure associated with a vehicle wheel brake. The method further includes determining whether a second roadway surface estimation value determined prior to the first roadway surface estimation value is indicative of the condition of the roadway surface. The method further includes selecting a lesser value of the first roadway surface estimation value and a third roadway surface estimation value determined prior to the second surface estimation value, when the second roadway surface estimation value is not indicative of the condition of the roadway surface.

A system for determining a surface estimation value indicative of a condition of a roadway surface in accordance with another exemplary embodiment that is provided. The system includes a controller configured to determine a first roadway surface estimation value based on a hydraulic pressure associated with a vehicle wheel brake. The controller is further configured to determine whether a second roadway surface estimation value determined prior to the first roadway surface estimation value is indicative of the condition of the roadway surface. The controller is further configured to select a lesser value of the first roadway surface estimation value and a third roadway surface estimation value determined prior to the second surface estimation value, when the second roadway surface estimation value is not indicative of the condition of the roadway surface.

A method for determining a surface estimation value indicative of a condition of a roadway surface in accordance with another exemplary embodiment is provided. The method includes determining a first roadway surface estimation value based on a vehicle longitudinal acceleration and a gain value. The method further includes determining whether a second roadway surface estimation value determined prior to the first roadway surface estimation value is indicative of the condition of the roadway surface. The method further includes selecting a lesser value of the first roadway surface estimation value and a third roadway surface estimation value determined prior to the second surface estimation value, when the second roadway surface estimation value is not indicative of the condition of the roadway surface.

A system for determining a surface estimation value indicative of a condition of a roadway surface in accordance with another exemplary embodiment is provided. The system includes a controller configured to determine a first roadway surface estimation value based on a vehicle longitudinal acceleration and a gain value. The controller is further configured to determine whether a second roadway surface estimation value determined prior to the first roadway surface estimation value is indicative of the condition of the roadway surface. The controller is further configured to select a lesser value of the first roadway surface estimation value and a third roadway surface estimation value determined prior to the second surface estimation value, when the second roadway surface estimation value is not indicative of the condition of the roadway surface.

DESCRIPTION OF EXEMPLARY EMBODIMENTS

Figure 1:
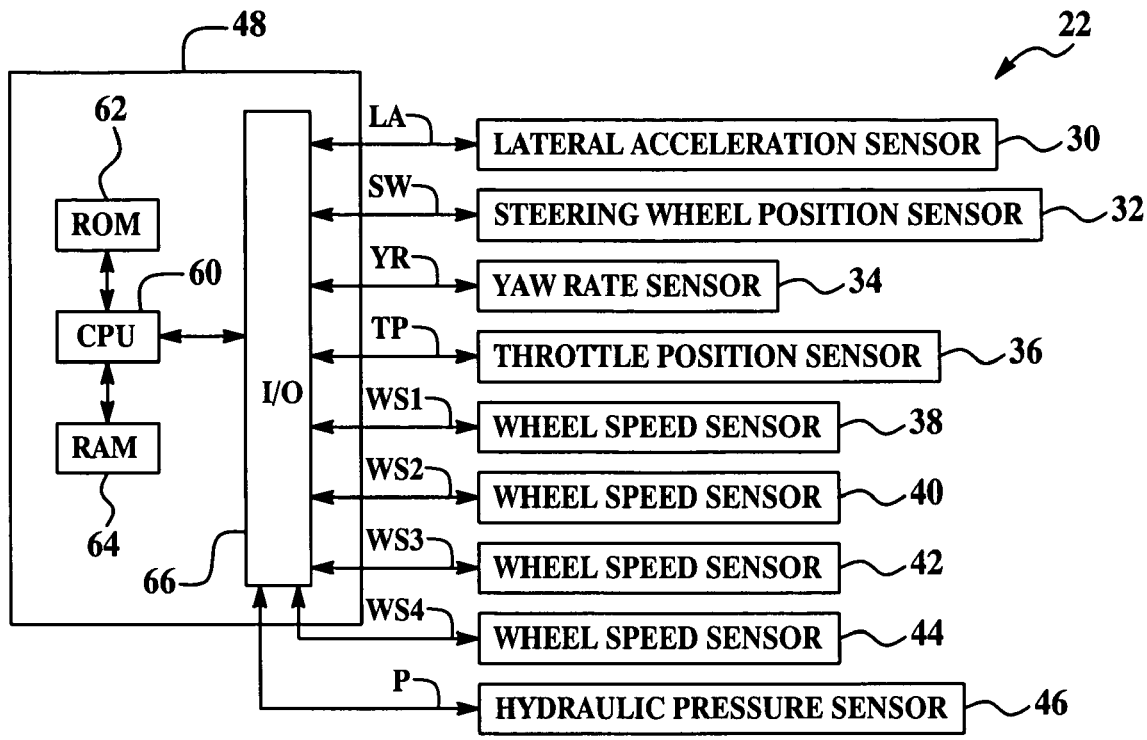
FIG. 1 is a block diagram of a system for determining when to update a surface estimation value indicative of a condition of a roadway surface and for updating the surface estimation value in accordance with an exemplary embodiment.
Figure 2:
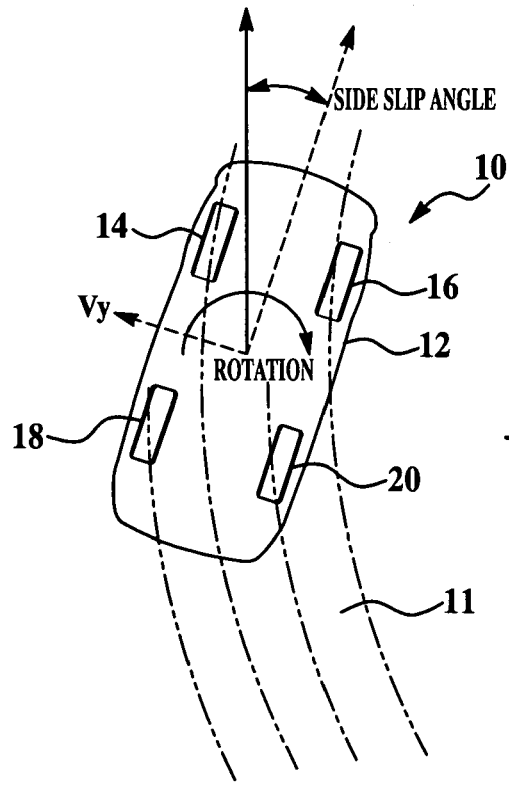
FIG. 2 is a diagram of a vehicle disposed on a roadway surface.
Figure 3:
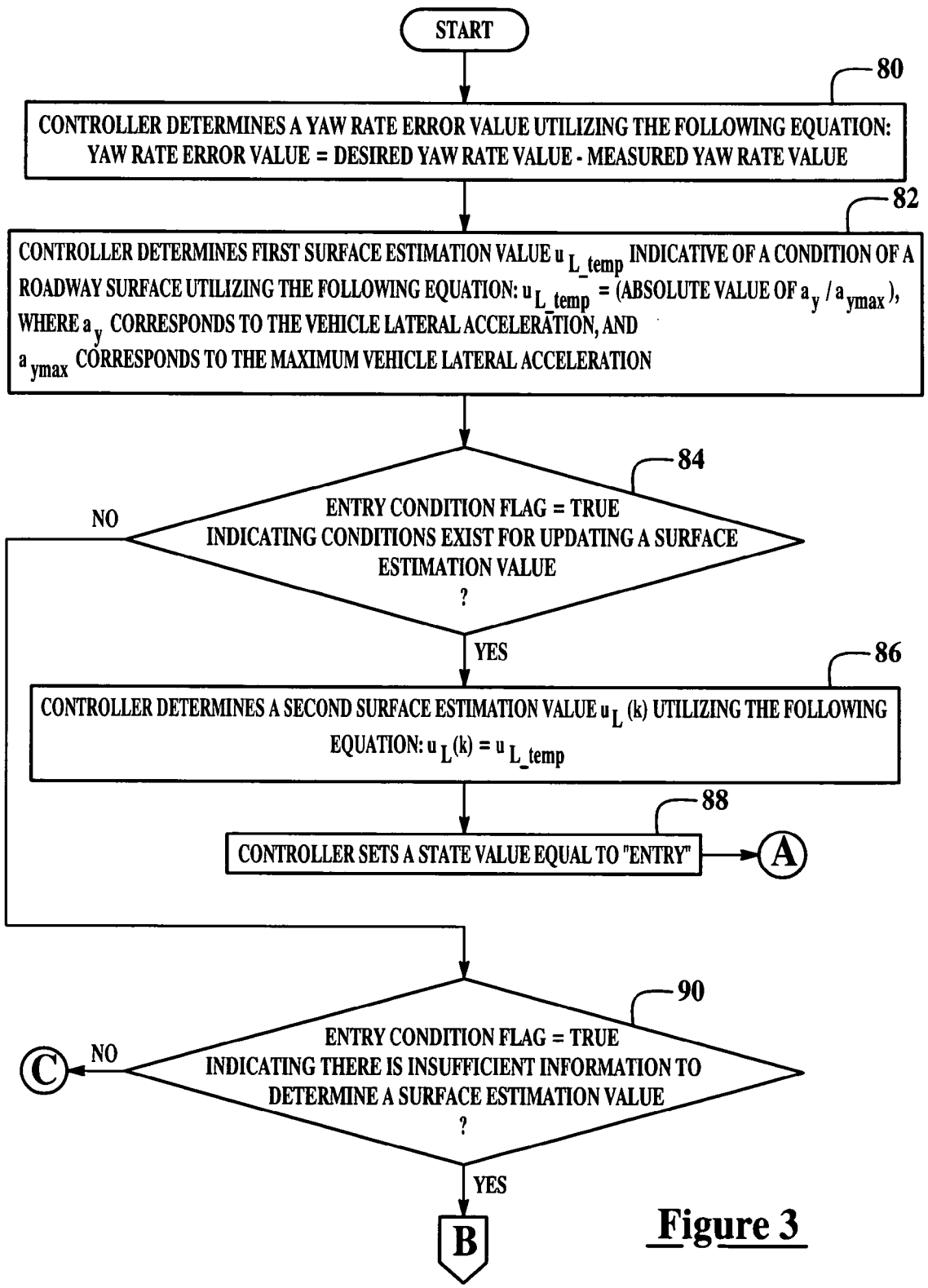
FIGS. 3-10 are flowcharts of a method for determining when to update a surface estimation value indicative of the condition of the roadway surface and for updating the surface estimation value in accordance with another exemplary embodiment.
Figure 4:
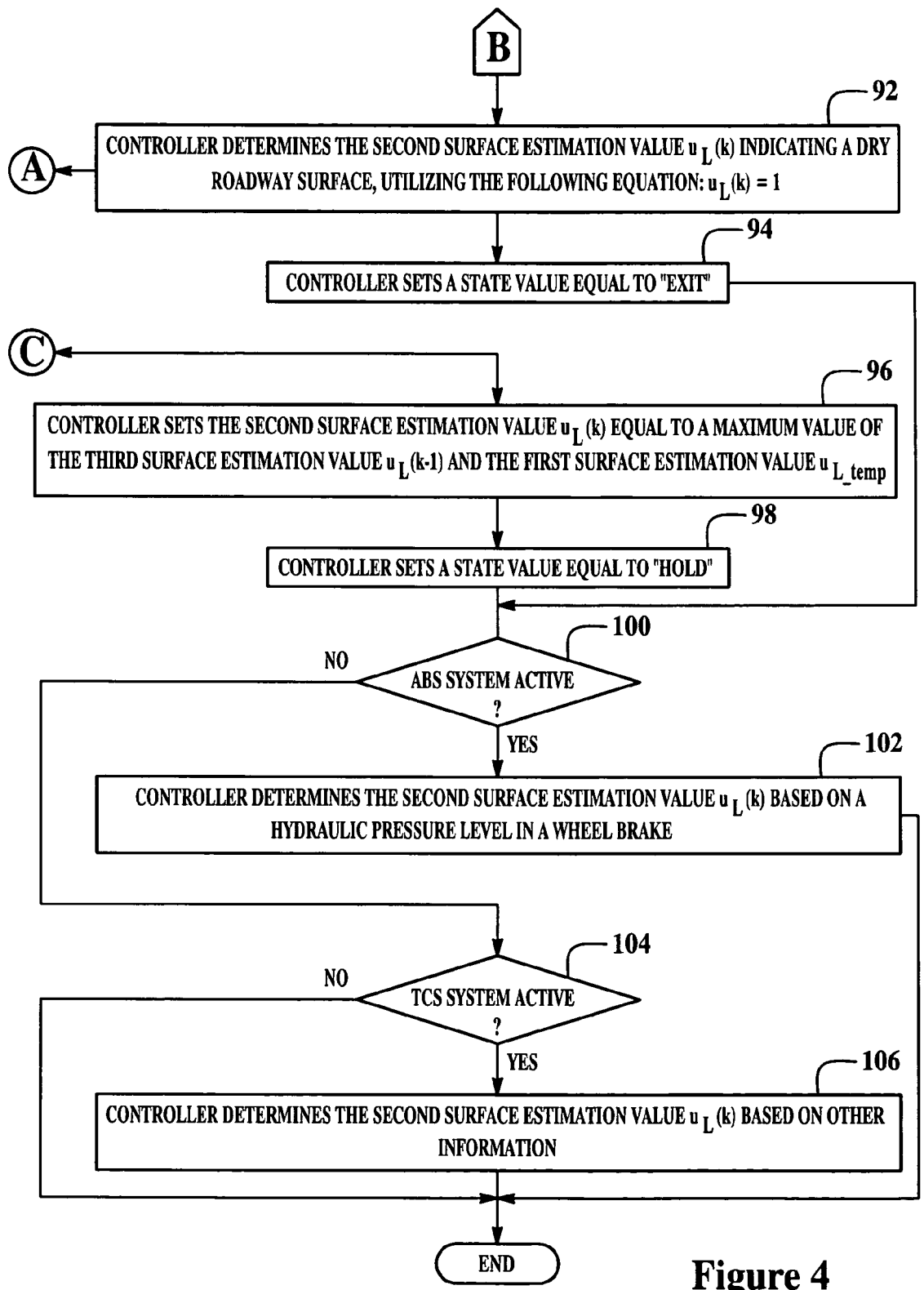
Figure 5:
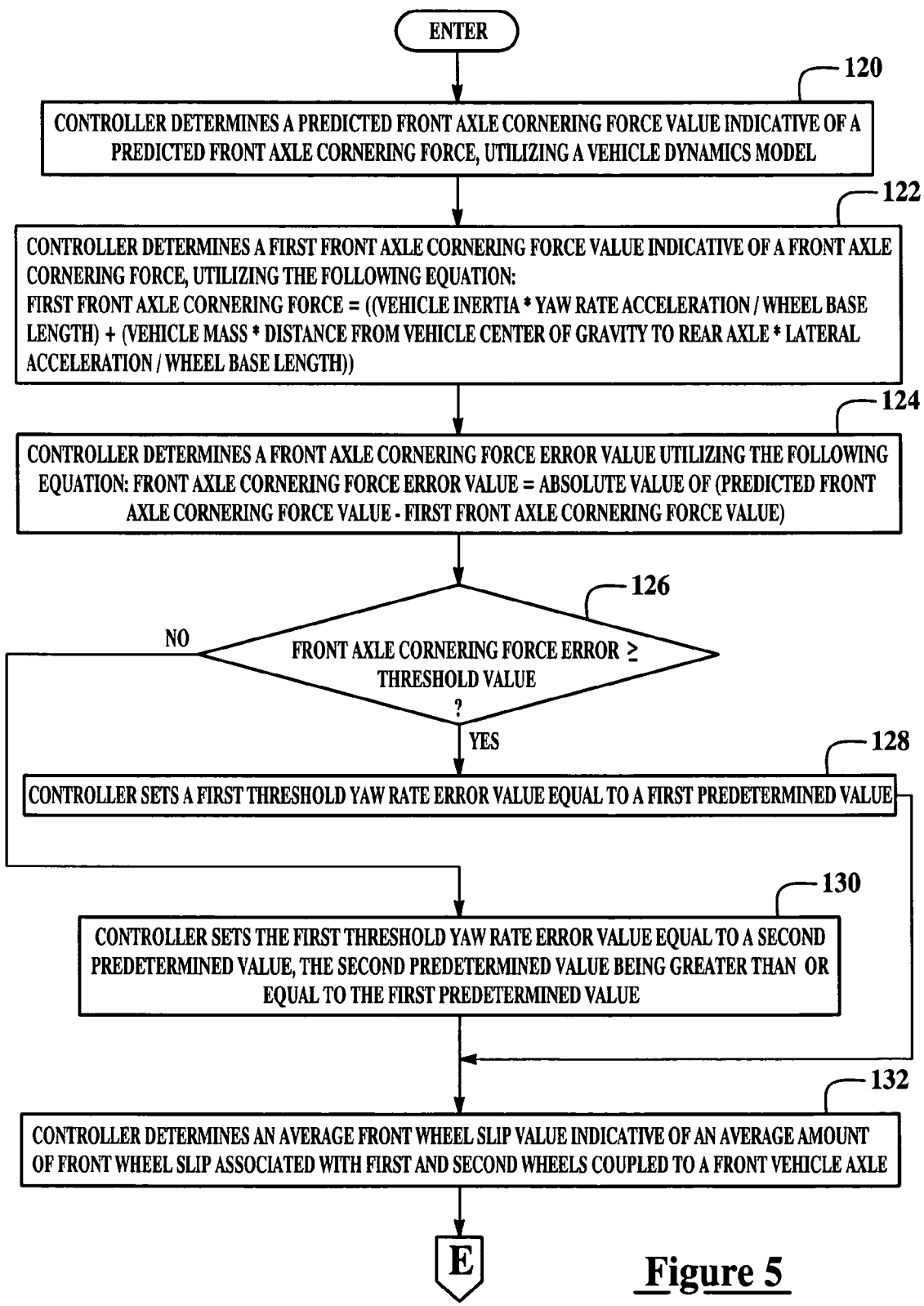
Figure 6:
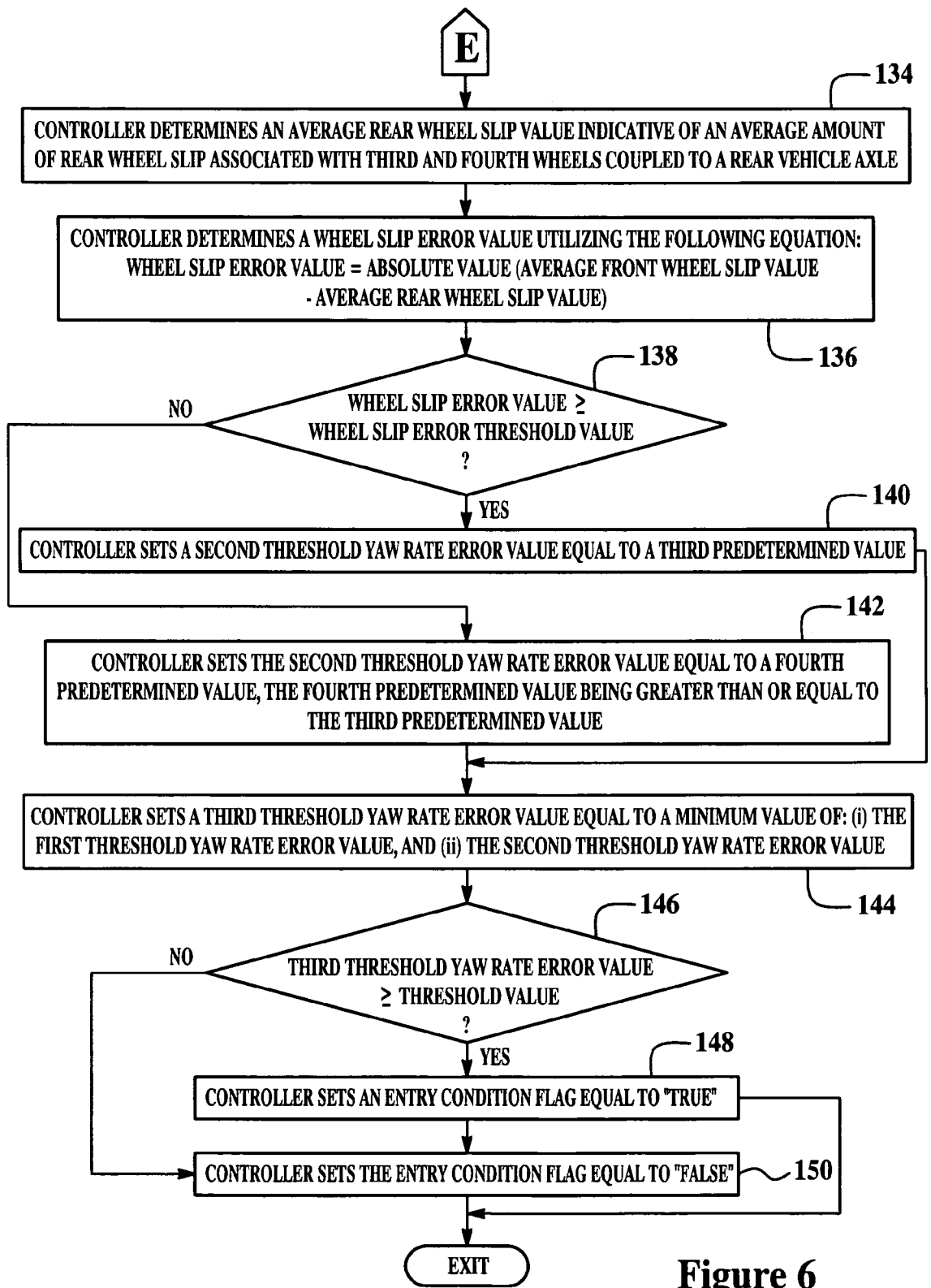
Figure 7:
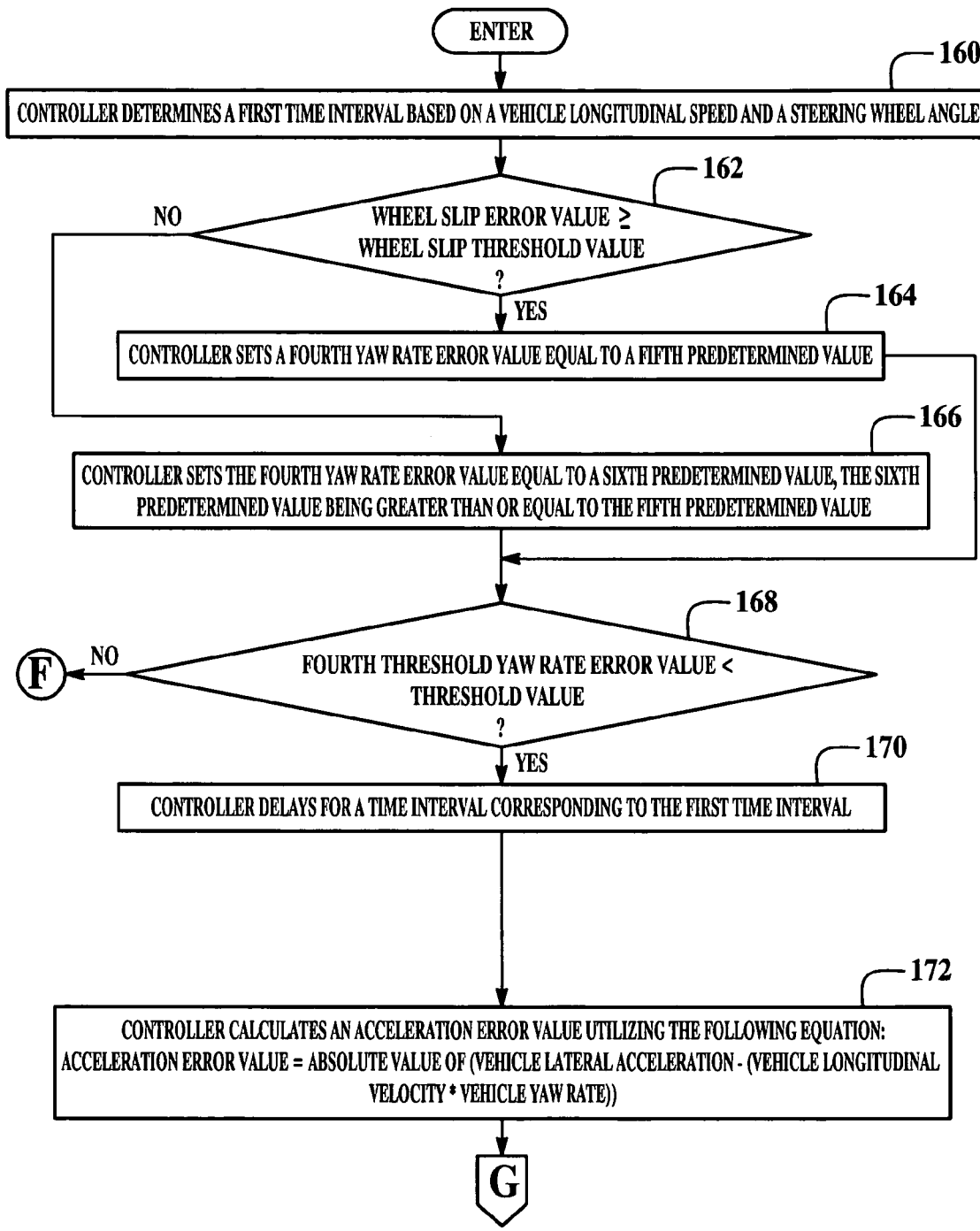
Figure 8:
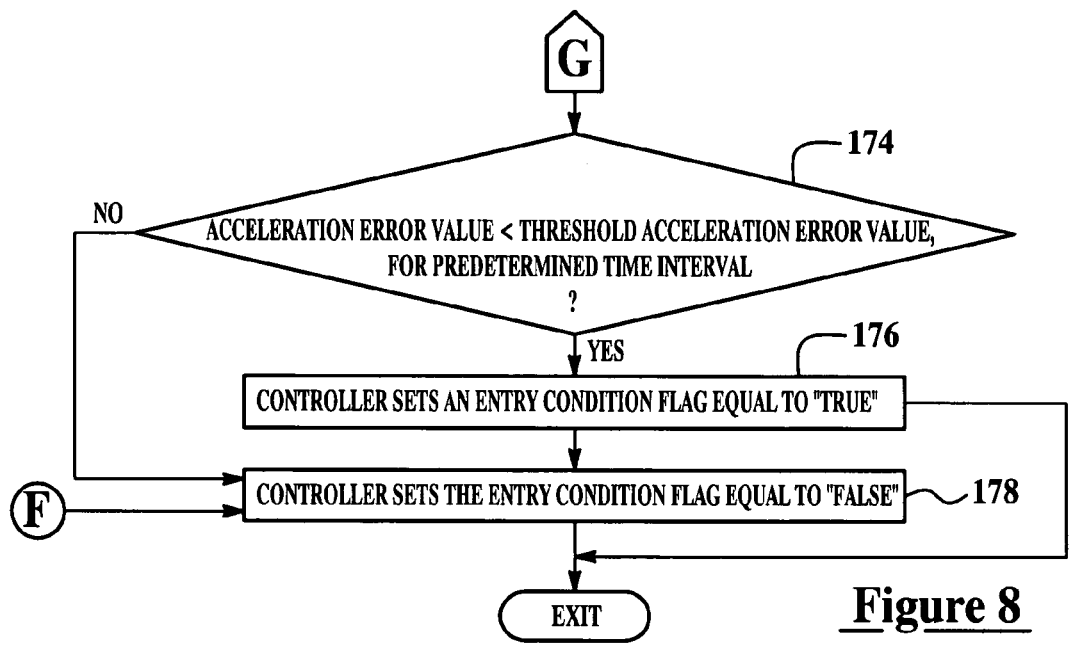
Figure 9:
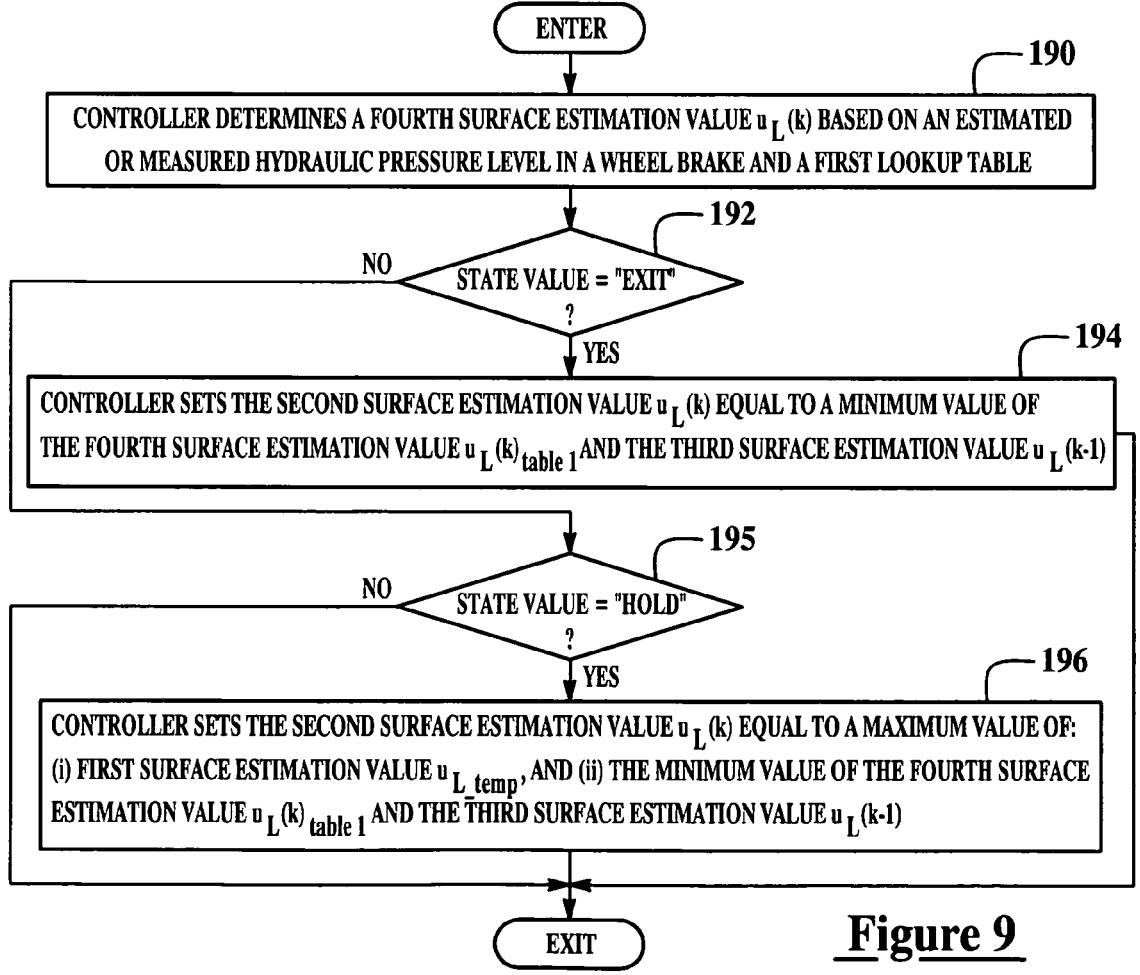
Figure 10:
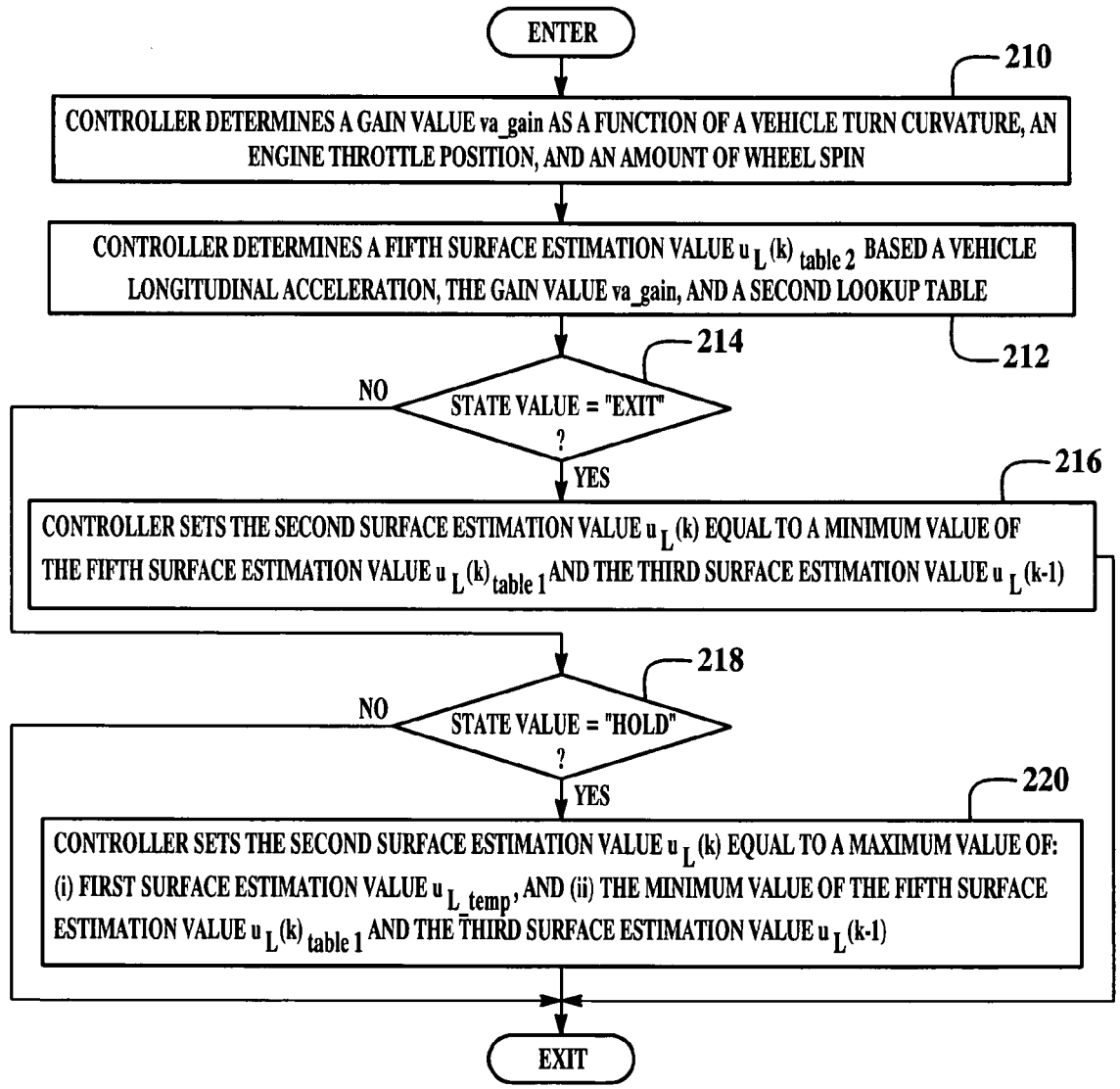

Referring to FIGS. 1 and 2, a vehicle 10 disposed on a roadway surface 11 is illustrated. The vehicle 10 includes a vehicle body 12, wheels 14, 16, 18, 20 and a system 22. The wheels 14, 16, 18, 20 are operably coupled to the vehicle body 12.

The system 22 is provided to determine when to update a surface estimation value indicative of the condition of a roadway surface and to update the surface estimation value. In one exemplary embodiment, the surface estimation value is a scalar value indicative of a frictional condition of the roadway surface. For example, when the surface estimation value is equal to "1", the surface estimation value indicates a dry condition on a roadway surface. Alternately, when the surface estimation value is equal to "0.1", the surface estimation value indicates a slippery condition (e.g., a low friction condition) on the roadway surface. For example, a slippery condition can occur when the roadway has ice formed thereon. The system 22 includes a lateral acceleration sensor 30, a steering wheel position sensor 32, a yaw rate sensor 34, a throttle position sensor 36, vehicle speed sensors 38, 40, 42, 44, a hydraulic pressure sensor 46, and a controller 48.

The lateral acceleration sensor 30 is provided to generate a signal (LA) indicative of a longitudinal acceleration of the vehicle 10. The lateral acceleration sensor 30 transmits the signal (LA) to the controller 48 which determines a longitudinal acceleration value associated with the vehicle 10 based on the signal (LA).

The steering wheel position sensor 32 is provided to generate a signal (SW) indicative of a rotational position of the steering wheel (not shown) of the vehicle 10. The steering wheel position sensor 32 transmits the signal (SW) to the controller 48 which determines a steering wheel position value based on the signal (SW).

The yaw rate sensor 34 is provided to generate a signal (YR) indicative of a yaw rate associated with the vehicle 10. The yaw rate of the vehicle 10 is a rate of rotation about a vertical axis of the vehicle 10. The yaw rate sensor 34 transmits the signal (YR) to the controller 48 which determines a yaw rate value based on the signal (YR).

The throttle position sensor 36 is provided to generate a signal (TP) indicative of a throttle position associated with an engine of the vehicle 10. The throttle position sensor 36 transmits the signal (TP) to the controller 48 which determines a throttle position value based on the signal (TP).

The wheel speed sensors 38, 40, 42, 44 are provided to generate signals (WS1), (WS2), (WS3), and (WS4), respectively, indicative of wheel speeds of the vehicle wheels 14, 16, 18, 20, respectively. The wheel speed sensors 38, 40, 42, 44 transmit the signals (WS1), (WS2), (WS3), and (WS4) to the controller 48 which determines wheel speed values based on the signals.

The hydraulic pressure sensor 46 is provided generate a signal (P) indicative of a hydraulic pressure level of a wheel brake (not shown) associated with the vehicle 10. The hydraulic pressure sensor 46 transmits the signal (P) to the controller 48 which determines a hydraulic pressure level value based on the signal (P).

The controller 48 is provided to execute algorithms for determining when to update the surface estimation value and for updating the surface estimation value. The controller 48 includes a central processing unit (CPU) 60, a read-only memory (ROM) 62, a volatile memory such as a random access memory (RAM) 64 and the I/O interface 66. The CPU 60 operably communicates with the ROM 62, the RAM 64, and the I/O interface 66. The computer readable media including ROM 62 and RAM 64 may be implemented using any of a number of known memory devices such as PROMs, EPROMs, EEPROMS, flash memory or any other electric, magnetic, optical or combination memory device capable of storing data, some of which represent executable instructions used by the CPU 60. The CPU 60 communicates via the I/O interface 66 with the lateral acceleration sensor 30, the steering wheel position sensor 32, the yaw rate sensor 34, the throttle position sensor 36, vehicle speed sensors 38, 40, 42, 44, and the hydraulic pressure sensor 46.

Referring to FIGS. 3-8, a method for determining when to update the surface estimation value and for updating the surface estimation value of the vehicle 10 will now be explained. The following method can be implemented utilizing software algorithms executed in the controller 48 of the system 22.

At step 80, the controller 48 determines a yaw rate error value utilizing the following equation: yaw rate error value=desired yaw rate value—measured yaw rate value. It should be noted that the desired raw rate is a yaw rate that the vehicle 10 should develop for a specific steering angle input and a specific vehicle speed while remaining in a safe vehicle stability range. The yaw rate error value is determined by either the controller 48 or a vehicle stablility control (VSC) system.

At step 82, the controller 48 determines a first surface estimation value $u_{L\_temp}$ indicative of a condition of a roadway surface utilizing the following equation: $u_{L\_temp}$=(absolute value of $a_{yy}/a_{ymax}$), where $a_{yy}$ corresponds to the vehicle lateral acceleration, and $a_{ymax}$ corresponds to the maximum vehicle lateral acceleration which the vehicle 10 can achieve on a dry, level roadway during a steady-state cornering condition.

At step 84, the controller 48 makes a determination as to whether the entry condition flag is equal to "true", indicating conditions exist for updating a surface estimation value. The step 84 is implemented utilizing the steps 120-150 which will be explained in greater detail below. If the value of step 84 equals "yes", the method advances to step 86. Otherwise, the method advances to step 90.

At step 86, the controller 48 determines a second surface estimation value $u_L(k)$ utilizing the following equation: $u_L(k)=u_{L\_temp}$ where k indicates a current sample in the process execution.

At step 88, the controller 48 sets a state value equal to "entry". After step 88, the method advances to step 92.

Referring again to step 84, when the value of step 84 equals "no", the method advances to step 90. At step 90, the controller 48 makes a determination as to whether the exit condition flag is equal to "true", indicating there is insufficient information to determine a surface estimation value. The step 90 will be implemented utilizing the steps 160-178 which will be explained in greater detail below. If the value of step 90 equals "yes", the method advances to step 92. Otherwise, the method advances to step 96.

At step 92, the controller 48 determines the second surface estimation value $u_L(k)$, indicating a dry roadway surface, utilizing the following equation: $u_L(k)=1$.

At step 94, the controller 48 sets a state value equal to "exit". After step 94, the method advances to step 100.

Referring again to step 90, when the value of step 90 equals "no", the method advances to step 96. At step 96, the controller 48 sets the second surface estimation value $u_L(k)$ equal to a maximum value of the third surface estimation value $u_L(k-1)$ and the first surface estimation value $u_{L\_temp}$.

At step 98, the controller 48 sets a state value equal to "hold". After step 98, method advances to step 100.

At step 100, the controller 48 makes a determination as to whether an anti-lock braking system (ABS) associated with the vehicle 10 is active. If the value of step 100 equals "yes", the method advances to step 102. Otherwise, the method advances to step 104.

At step 102, the controller 48 determines the second surface estimation value $u_L(k)$ based on a hydraulic pressure level in a wheel brake. The step 102 is implemented utilizing steps 190-196 which will be explained in greater detail below. After step 102, the method is exited.

At step 104, the controller 48 makes a determination as to whether a traction control system (TCS) associated with the vehicle 10 is active. If the value of step 104 equals "yes", the method advances to step 106. Otherwise, the method is exited.

At step 106, the controller 48 determines the second surface estimation value $u_L(k)$ based on other information from a traction control system (TCS) (not shown). The step 106 is implemented utilizing steps 210-220 which will be explained in greater detail below. After step 106, the method is exited.

Referring again to step 84, the step 84 is implemented utilizing the steps 120-150 which will now be explained.

At step 120, the controller 48 determines a predicted front axle cornering force value indicative of a predicted front axle cornering force, utilizing a vehicle dynamics model.

At step 122, the controller 48 determines a first front axle cornering force value indicative of a front axle cornering force, utilizing the follow equation:

first front axle cornering force=((vehicle inertia*yaw rate acceleration/wheel base length)+(vehicle mass*distance from vehicle center of gravity to rear axle*lateral acceleration/wheel base length)).

At step 124, the controller 48 determines a front axle cornering force error value utilizing the following equation: front axle cornering force error value=absolute value of (predicted front axle cornering force value−first front axle cornering force value).

At step 126, the controller 48 makes a determination as to whether the front axle cornering force error is greater than or equal to a threshold value. If the value of step 126 equals "yes", the method advances to step 128. Otherwise, the method advances to step 130.

At step 128, the controller 48 sets a first threshold yaw rate error value equal to a first predetermined value. After step 128, the method advances to step 132.

Referring again to step 126, when the value of step 126 equals "no", method advances to step 130. At step 130, controller 48 sets the first threshold yaw rate error value equal to a second predetermined value, wherein the second predetermined value being greater than or equal to the first predetermined value. After step 130, the method advances to step 132

At step 132, the controller 48 determines an average front wheel slip value indicative of an average amount of front wheel slip associated with the wheels 14, 16 coupled to a front vehicle axle (not shown.)

At step 134, the controller 48 determines an average rear wheel slip value indicative of an average amount of rear wheel slip associated with the wheels 18, 20 coupled to a rear vehicle axle (not shown.)

At step 136, the controller 48 determines a wheel slip error value utilizing the following equation: wheel slip error value=absolute value of (average front wheel slip value−average rear wheel slip value).

At step 138, the controller 48 makes a determination as to whether the wheel slip error value is greater than or equal to the wheel slip error threshold value. If the value of step 138 equals "yes", the method advances to step 140. Otherwise, the method advances to step 142.

At step 140, the controller 48 sets a second threshold yaw rate error value equal to a third predetermined value. After step 140, the method advances to step 144.

At step 142, the controller 48 sets the second threshold yaw rate error value equal to a fourth predetermined value wherein the fourth predetermined value is greater than or equal to the third predetermined value. After step 142, the method advances to step 144.

At step 144, the controller 48 sets a third threshold yaw rate error value equal to a minimum value of: (i) the first threshold yaw rate error value and (ii) the second threshold yaw rate error value.

At step 146, the controller 48 makes a determination as to whether the third threshold yaw rate error value is greater than or equal to a threshold value. If the value of step 146 equals "yes", the method advances to step 148. Otherwise, the method advances to step 150.

At step 148, the controller 48 sets the entry condition flag equal to "true". After step 148, the method advances to step 86.

At step 150, the controller 48 sets the entry condition flag equal to "false". After step 150, the method advances to step 90.

Referring again to step 90, the step 90 is implemented utilizing the steps 160-178 which will now be explained.

At step 160, the controller 48 determines a first time interval based on a vehicle longitudinal speed and a steering wheel angle.

At step 162, the controller 48 makes determination as to whether the wheel slip error value is greater than or equal to the wheel slip threshold value. If the value of step 162 equals "yes", method advances to step 164. Otherwise, method advances to step 166.

At step 164, the controller 48 sets a fourth yaw rate error value equal to a fifth predetermined value. After step 164, the method advances to step 168.

At step 166, the controller 48 sets the fourth yaw rate error value equal to a sixth predetermined value, wherein the sixth predetermined value is greater than or equal to the fifth predetermined value. After step 166, the method advances to step 168.

At step 168, the controller 48 makes a determination as to whether the fourth threshold yaw rate error value is less than a threshold value. If the value of step 168 equals "yes", the method advances to step 170. Otherwise, the method advances to step 178.

At step 170, controller 48 delays for a time interval corresponding to the first time interval.

At step 172, the controller 48 calculates an acceleration error value utilizing the following equation: acceleration error value=absolute value of (vehicle lateral acceleration−(vehicle longitudinal velocity*vehicle yaw rate)).

At step 174, the controller 48 makes a determination as to whether the acceleration error value is less than the threshold acceleration error value, for a predetermined time interval. If the value of step 174 equals "yes", the method advances to step 176. Otherwise, the method advances to step 178.

At step 176, the controller 48 sets an exit condition flag equal to "true". After step 176, the method advances to step 92.

At step 178, the controller 48 sets the exit condition flag equal to "false". After step 178, the method advances to step 96.

Referring again to step 102, the step 102 is implemented utilizing steps 190-196.

At step 190, the controller 48 determines a fourth surface estimation value $u_L(k)_{table1}$ based on an estimated or measured hydraulic pressure level of a wheel brake and a first lookup table.

At step 192, the controller 48 makes a determination as to whether the state value equals "exit". If the value of step 192 equals "yes", the method advances to step 194. Otherwise, the method advances to step 195.

At step 194, the controller 48 sets the second surface estimation value $u_L(k)$ equal to a minimum value of the fourth surface estimation value $u_L(k)_{table1}$ and the third surface estimation value $u_L(k-1)$. After step 194, the method is exited.

At step 195, the controller 48 makes a determination as to whether the state value equals "hold". The value step 195 equals "yes", the method advances to step 196. Otherwise, the method is exited.

At step 196, the controller 48 sets the second surface estimation value $u_L(k)$ equal to a maximum value of: (i) first surface estimation value $u_{L\_temp}$, and (ii) the minimum value of the fourth surface estimation value $u_L(k)_{table1}$ and the third surface estimation value $u_L(k-1)$. After step 196, the method is exited Referring again to step 106, the step 106 is implemented utilizing steps 210-220.

At step 210, controller 48 determines a gain value va_gain as a function of a vehicle turn curvature, an engine throttle position, and an amount of wheel spin.

At step 212, the controller 48 determines a fifth surface estimation value $u_L(k)_{table2}$ based on a vehicle longitudinal acceleration, the va_gain, and a second lookup table.

At step 214, the controller 48 makes a determination as to whether the state value is equal to "exit". If the value of step 214 equals "yes", the method advances to step 216. Otherwise, method advances to step 218.

At step 216, the controller 48 sets the second surface estimation value $u_L(k)$ equal to a minimum value of the fifth surface estimation value $u_L(k)_{table2}$ and the third surface estimation value $u_L(k-1)$. After step 216, method advances to step 218.

At step 218, the controller 48 makes a determination as to whether the state value equals "hold". If the value of step 218 equals "yes", the method advances to step 220. Otherwise, the method is exited.

At step 220, the controller 48 sets the second surface estimation value $u_L(k)$ equal to a maximum value of: (i) first surface estimation value $u_{L\_temp}$, and (ii) the minimum value of the fifth surface estimation value $u_L(k)_{table2}$ and the third surface estimation value $u_L(k-1)$. After step 220, the method is exited.

The system and the method for determining when to update a surface estimation value indicative of a condition of a roadway surface represents a substantial improvement over other systems and methods. In particular, the system and method provide a technical effect of determining when to update a surface estimation value indicative of a roadway condition based on predicted vehicle operating parameters.

As described above, the above-described method can be embodied in the form of computer-implemented software algorithms and apparatuses for practicing those processes. In an exemplary embodiment, the method is embodied in computer program code executed by one or more elements. The present method may be embodied in the form of computer program code containing instructions stored in tangible media, such as floppy diskettes, CD-ROMs, hard drives, flash memory, or any other computer-readable storage medium, wherein, when the computer program code is loaded into and executed by a computer, the computer becomes an apparatus for practicing the invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for determining when to update a surface estimation value indicative of a condition of a roadway surface, comprising:

determining a yaw rate error of a vehicle;

determining a predicted front axle cornering force value indicative of a predicted front axle cornering force, utilizing a vehicle dynamics model;

determining a first front axle cornering force value indicative of a front axle cornering force, based on a lateral acceleration value;

determining a front axle cornering force error value based on the predicted front axle cornering force value and the first front axle cornering force value;

determining a threshold yaw rate error value based on the front axle cornering force error value; and indicating that the surface estimation value is to be updated when the yaw rate error value is greater than the threshold yaw rate error value.

2. The method of claim 1, wherein determining the threshold yaw rate error value comprises:

setting the threshold yaw rate error value equal to a first predetermined value when the front axle cornering force error value is greater than or equal to a threshold value; and setting the threshold yaw rate error value equal to a second predetermined value when the front axle cornering force error value is less than the threshold value, the first predetermined value being less than the second predetermined value.

3. A system for determining when to update a surface estimation value indicative of a condition of a roadway surface, comprising:

at least one sensor generating a signal indicative of a lateral acceleration; and a controller operably communicating with the sensor, the controller configured to determine a predicted front axle cornering force value indicative of a predicted front axle cornering force, utilizing a vehicle dynamics model, the controller further configured to determine a first front axle cornering force value indicative of a front axle cornering force, based on the signal indicative of the lateral acceleration, the controller further configured to determine a front axle cornering force error value based on the predicted front axle cornering force value and the first front axle cornering force value, the controller further configured to determine a threshold yaw rate error value based on the front axle cornering force error value, the controller further configured to indicate that the surface estimation value is to be updated when a yaw rate error value is greater than the threshold yaw rate error value.

* * * * *